United States Patent [19]
Blaine

[11] B 3,985,859
[45] Oct. 12, 1976

[54] VACUUM STRIPPING OF AMMONIA

[75] Inventor: Louis I. Blaine, South Orange, N.J.

[73] Assignee: Ecodyne Corporation, Lincolnshire, Ill.

[22] Filed: July 3, 1974

[21] Appl. No.: 485,401

[44] Published under the second Trial Voluntary Protest Program on January 27, 1976 as document No. B 485,401.

[52] U.S. Cl................................. 423/238; 423/396
[51] Int. Cl.$^2$........................................... C01C 3/00
[58] Field of Search.................. 423/237, 238, 396; 55/70; 210/26, 32; 203/10, 11, DIG. 14, 34, 35, 49; 202/185 B

[56] References Cited
UNITED STATES PATENTS

| | | | |
|---|---|---|---|
| 2,808,125 | 10/1957 | Back et al. | 55/70 |
| 3,038,285 | 7/1962 | Mavrovic | 55/70 |
| 3,428,426 | 2/1969 | Carney et al. | 55/70 |
| 3,448,042 | 6/1969 | Mattia et al. | 210/26 |
| 3,758,277 | 9/1973 | Cook et al. | 423/396 |
| 3,775,088 | 11/1973 | Higgins | 423/396 |
| 3,804,757 | 4/1974 | Ruschenburg | 55/70 |

FOREIGN PATENTS OR APPLICATIONS

| | | | |
|---|---|---|---|
| 265,576 | 9/1964 | Australia | 423/238 |
| 334,179 | 6/1970 | U.S.S.R. | 423/237 |

*Primary Examiner*—Oscar R. Vertiz
*Assistant Examiner*—Eugene T. Wheelock
*Attorney, Agent, or Firm*—Joel E. Siegel

[57] ABSTRACT

A method and apparatus for stripping ammonia from an alkaline regenerant solution used for the regeneration of a zeolite ion exchange bed. The regenerant passes through a stripping column. An acidic working solution is circulated from a holding tank through a vacuum creating means and then back into the holding tank. The ammonia is stripped from the regenerant under a vacuum created in the stripping column by the vacuum creating means so as to cause the stripped ammonia to chemically react with working solution to form an ammonium salt solution. Carbon dioxide free air is passed upward through the column countercurrent to the flow of regenerant.

9 Claims, 2 Drawing Figures

VACUUM STRIPPING OF AMMONIA

BACKGROUND OF THE INVENTION

The present invention relates to a method and apparatus for stripping ammonia from an alkaline regenerant solution used for the regeneration of a zeolite ion exchange bed.

Ammonium ions interfere with many of the important uses of water. They are toxic to fish, corrosive to metals and concrete, and a matter of concern when consumed by man. These ions enter water supply systems from a variety of sources, one major input being the discharge of municipal and industrial wastewaters with high ammonium ion concentrations. Most sanitary discharges contain 15 to 30 parts per million (ppm) ammonia as nitrogen (typically 20 ppm). A generally accepted goal of the industry is to reduce this ion level to the lowest value commensurate with economy and good engineering practice (0–3 ppm). This level can be achieved by the regeneration process embodied in the present invention.

Traditionally, emphasis in wastewater treatment has been placed on the removal of biologically degradable organic material, suspended solids, and floating substances. The objectives of such treatment are to produce a clear effluent, which, when mixed with the receiving water, will produce minimal oxygen depletion and no gross signs of pollution or objectionable odors. The physical and biological treatment processes developed to achieve these objectives do not reduce ammonium ion concentrations to desirable levels. Therefore, some form of ammonia removal is necessary prior to the discharge of the wastewater. Considerable attention has been directed to the effective and economic removal of ammonia nitrogen from wastewater streams.

Nitrogen can be removed through microbial action on conventional biological waste treatment plants. Removal using the standard activated sludge process requires a sufficient mean cell residence time to allow nitrification bacteria to become established in the system. The required aeration period length negates the economic advantages of high rate biological systems. Even in a compartmentalized system, treatment periods are long and problems develop in maintaining systems with different biological functions. In addition, algal harvesting or stripping requires more land than other plant processes. Biological nitrification-denitrification has proven erratic and inadequate to meet water quality criteria.

The uncertainties and costs of biological removal have stimulated the investigation of physical/chemical removal of ammonia nitrogen by an ion exchange process. Ion exchange ammonia removal is more amenable to control than biological processes and more adaptable to the fluctuating flows and concentrations of municipal wastewater systems. As a unit process, ion exchange is easily controlled to achieve almost any desired product quality. In the ion exchange process, the ion exchange material exchanges the ammonium ion ($NH_4^+$) in the waste stream for ions originally in the ion exchange bed.

The ion exchange process to which the present invention is directed, uses a zeolite bed, such as clinoptilolite (a natural zeolite), through which a clarified sewage effluent flows. As the influent passes through the bed, $NH_4^+$ ions lodge on active sites on the zeolite. The exchange medium preferentially absorbs ammonium ions in the presence of sodium, calcium and magnesium ions. A complete discussion of the use of a clinoptilolite ion exchange bed for the removal of ammonia may be found in a report approved for publication by the Environmental Protection Agency entitled: Optimization of Ammonia Removal by Ion Exchange Using Clinoptilolite by the Sanitary Engineering Research Laboratory, College of Engineering and School of Public Health, University of California, Berkeley (September 1971).

The removal of ammonium ions through ion exchange has proven to be the simplest part of the job. The technically challenging aspects come in regenerating the ion exchange bed and disposing of the regenerant. When the clinoptilolite bed becomes exhausted with ammonia, it is necessary to regenerate the bed by passing an appropriate regenerant solution therethrough. Heretofore proposed regenerant solutions have been composed of various concentrations of NaCl or $CaCl_2$, and NaOH or $Ca(OH)_2$ adjusted to a pH of about 10.5. The regenerant passes through the exhausted bed to replace the ammonium ions with sodium or calcium ions. This regeneration also chemically changes the $NH_4^+$ to $NH_3$. Heretofore, it has been the practice to either discard the regenerant solution after one use or reuse it only after stripping the ammonia from it. When the regenerant solution is used only once, it adds significantly to the cost of the process. The present invention is directed to a unique method and apparatus for stripping ammonia from the regenerant solution.

SUMMARY OF THE INVENTION

It is an object of the present invention to provide a method and apparatus for efficiently stripping ammonia from an alkaline regenerant solution passing through a stripping column.

Another object is to provide a method and apparatus for stripping ammonia from an alkaline regenerant solution passing through a stripping column which produces an ammonium salt solution of possible economic value, in a manner that does not interfere with the surrounding environment.

A further object of the present invention is to provide a method and apparatus for stripping ammonia from an alkaline regenerant solution passing through a stripping column which uses an ammonium salt solution as the means to create a vacuum in the stripping column.

A still further object of the present invention is to provide a method and apparatus for stripping ammonia from an alkaline regenerant solution which passes through a stripping column countercurrent to a flow of carbon dioxide-free air.

Briefly stated, the present invention includes a stripping column through which the regenerant passes and a closed loop vacuum system. The vacuum system consists of an ejector or a liquid seal vacuum pump and a tank. The vacuum system contains a weakly acidic working solution which is cycled from the tank, through the vacuum producing device, and back to the tank. The vacuum side of the ejector or the liquid seal vacuum pump is connected to the stripping column to produce the vacuum used to strip the ammonia from the regenerant. The stripped ammonia is absorbed and concentrated in the working solution by a chemical reaction to produce an ammonium salt solution. The working solution thus serves the dual purpose of generating the vacuum used to strip the ammonia from the regenerant and absorbing and concentrating the ammonia by a chemical reaction. This combination of of ammonia stripping and recovery simplifies the over-all process.

To increase the ammonia removal efficiency, carbon dioxide-free air is passed through the column countercurrent to the flow of regenerant. The carbon dioxide is removed from the air to prevent calcium carbonate precipitation in the column. In the present invention, one embodiment recirculates the same carbon dioxide-free air through the column in a closed loop and another embodiment directs air through stripped regenerant and then into the stripping column. The air is passed through stripped regenerant in this second embodiment for both carbon dioxide removal and additional ammonia recovery.

BRIEF DESCRIPTION OF THE DRAWINGS

Other objects and the attendant advantages of the present invention will be readily appreciated as the same becomes better understood by reference to the following detailed description in conjunction with the accompanying drawings.

DESCRIPTION OF PREFERRED EMBODIMENTS

Figure 1:
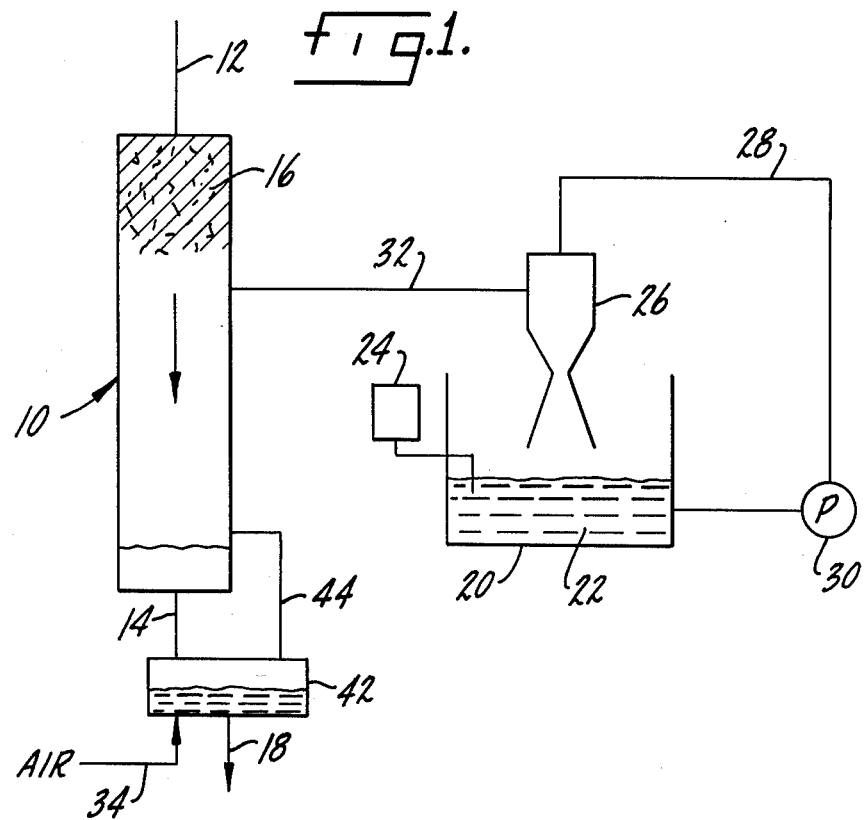
FIG. 1 is a diagrammatic view of a first embodiment of the apparatus in accordance with the present invention.

Referring to FIG. 1, a preferred embodiment of the apparatus in accordance with the present invention is diagrammatically illustrated. The apparatus includes a stripping column 10 of conventional construction, having an influent tube 12 associated with a top portion and an effluent tube 14 associated with a bottom portion. Column 10 is packed with a well known packing material 16. The regenerant to be stripped passes through column 10 in a downward mode as indicated by the arrow in FIG. 1.

A working solution holding tank 20 is provided to hold a weak acidic working solution, indicated at 22 in FIG. 1. The working solution is preferably a weak nitric acid solution having a pH of approximately 6. Other weak acid solutions may be used in accordance with the present invention. A small acid feeder tank 24 is provided in communication with tank 20 for providing small quantities of strong acid thereto to maintain the pH of the working solution at approximately 6.

Extending downward into tank 20 is a conventional ejector 26 of well known construction. The working solution 22 is continuously cycled from tank 20 through a line 28 by a recirculation pump 30 of well known construction, and then through ejector 26 back into tank 20. A vacuum inlet line 32 connects the vacuum side of ejector 26 with the interior of column 10 to create a vacuum in column 10 as the working solution flows through ejector 26. An air inlet line 34 is provided to direct air upwardly through the stripped regenerant contained in the sealed tank 42 and then out of the tank and into air line 44 through which it enters column 10. Stripped regenerant from column 10 exits through effluent tube 14 and enters tank 42. From tank 42, stripped regenerant exits through effluent tube 18.

In operation, a spent alkaline regenerant solution (i.e., NaCl, NaOH and NH₃) is directed through influent tube 12 and downwardly through stripping column 10 and then out effluent tube 14. As the regenerant contacts the packing material 16, the ammonia is stripped from the regenerant solution in a well known manner. Air is passed upwardly through the stripped regenerant solution after leaving column 10 through effluent tube 14. The passage of the air through the column 10 increases the rate of ammonia recovery. Additionally, by initially contacting the air with the stripped regenerant in tank 42, the CO₂ is removed from the air and forms a CaCO₃ precipitate which exits with the stripped regenerant and therefore does not enter column 10. This prevents the build-up of CaCO₃ within the column 10.

A vacuum is drawn in column 10 through line 32 by ejector 26. This vacuum causes the withdrawal of the stripped ammonia and the air from column 10 through line 32 into the ejector 26. The ammonia is absorbed and chemically reacts with the working solution circulating through the ejector 26 to form an ammonium salt solution in accordance with the following equation:

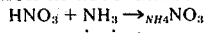
$$HNO_3 + NH_3 \rightarrow {}_{NH_4}NO_3$$

The ammonia is trapped once it enters the ejector 26 and then chemically reacts with the acidic working solution to form ammonium nitrate. It can thus be seen that the acidic working solution 22 serves the dual purpose of generating the vacuum necessary to strip the ammonia from the regenerant within column 10 and to absorb the stripped ammonia and chemically react with it to form an ammonium nitrate solution. Acid from tank 24 is periodically added to the working solution 22 to maintain the pH at approximately 6. The ammonium nitrate solution does not interfere with the environment and in fact has economic value.

Figure 2:
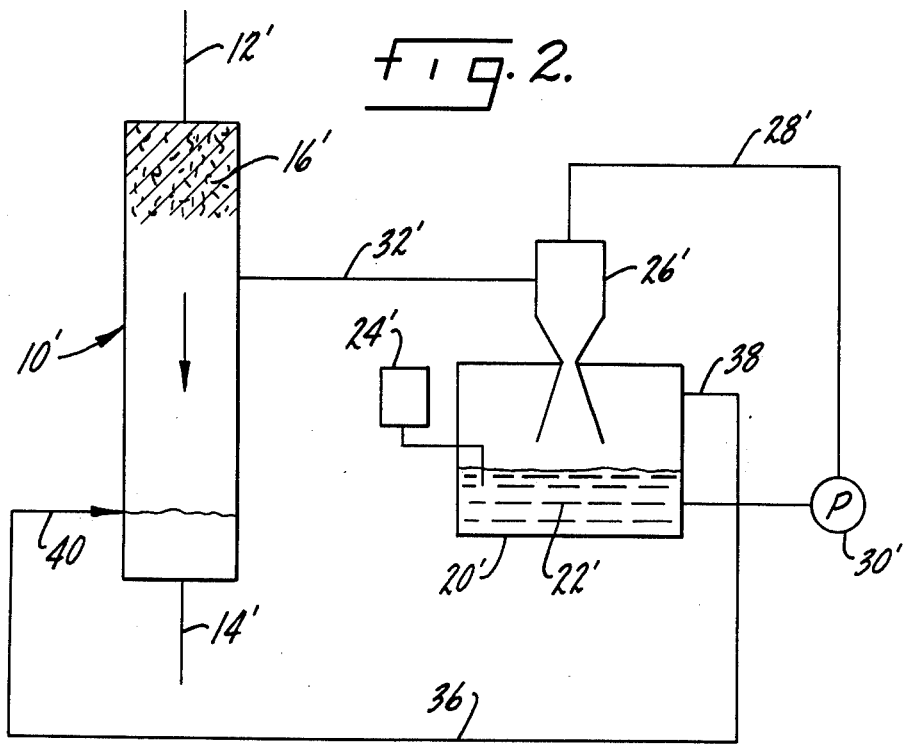
FIG. 2 is a diagrammatic view of a second embodiment of the apparatus in accordance with the present invention.

Referring to FIG. 2, a second preferred embodiment of the apparatus in accordance with the present invention is diagrammatically illustrated. The component parts of this embodiment are substantially the same as those used in the embodiment of FIG. 1 and they are accordingly designated by the same numerals followed by a prime sign. A conventional stripping column 10' is provided having an influent tube 12' and an effluent tube 14'. Column 10' is packed with a packing material 16' for contact with the regenerant passing through column 10' in a downward mode as indicated by the arrow in FIG. 2.

The working solution holding tank 20', which holds working solution 22', is covered in a substantially air tight manner for reasons which will hereinbelow become more apparent. Acid feeder tank 24' is provided in communication with tank 20' to provide small quantities of strong acid thereinto for maintaining the pH of the working solution at approximately 6. An ejector 26' extends down into tank 2'. The working solution 22' is cycled from tank 20' through line 28' by a recirculation pump 30' and then through ejector 26' back into tank 20'. Vacuum inlet line 32' connects the vacuum side of ejector 26' with the interior of column 10'. With the exception that tank 20' is a closed vessel, the apparatus of FIG. 2 as described so far is substantially the same as that in FIG. 1.

The unique feature of the embodiment of FIG. 2 is in the manner in which the air is curculated through the system in a closed loop. An air recirculation line 36 has a first end 38 in communication with an upper portion of tank 20', and a second end 40 in communication with a lower portion of column 10'. Air is recirculated through a closed loop from tank 20' through line 36 into column 10' and then out column 10' through line 32' and ejector or pump 26' back into tank 20'.

In operation, the spent regenerant solution is directed through influent tube 12' and downwardly through stripping column 10' and then out effluent tube 14'. As the regenerant contacts the packing material 16', the ammonia is stripped from the regenerant solution in a well known manner. The vacuum drawn in column 10' through line 32' by ejector 26' is effective to cause the withdrawal of the stripped ammonia and the air from column 10' through line 32' into the ejector 26'. The ammonia chemically reacts with the acidic working solution circulating through the ejector 26' to form a concentrated ammonium nitrate solution in the same manner as in the embodiment of FIG. 1.

The air, which is continuously passed upward through column 10', is substantially free of carbon dioxide. This is accomplished by recirculating the same $CO_2$ free air which leaves column 10' via line 32' back through the column via air recirculation line 36. As alluded to above, the $CO_2$ is initially removed from the air in column 10' in the form of $CaCO_3$. Thus, the air leaving column 10' through line 32' and entering tank 20' via ejector 26' is substantially free of $CO_2$. This air is removed from the top portion of tank 20' and directed to a lower portion of column 10' through line 36. The recirculation of $CO_2$ free air increases the amount of ammonia removal, while preventing the formation of $CaCO_3$ within column 10'.

The present invention contemplates the use of other well known means for circulating the working solution and creating a vacuum within the stripping column than the use of an ejector in combination with a recirculation pump. For example, a liquid seal vacuum pump may be substituted for ejector 26 and pump 30 in line 28. The vacuum side of the liquid seal vacuum pump would be in communication with column 10 to create the vacuum therein.

In summary, the present invention provides a method and apparatus for stripping ammonia from an alkaline regenerant solution which uses an acidic working solution which performs the dual purpose of generating a vacuum within the stripping column to strip ammonia from the regenerant and chemically reacts with the ammonia to form an ammonium salt solution. Both embodiments of the invention additionally provide $CO_2$ free air to the column to increase the amount of ammonia removal, while preventing the formation of $CaCO_3$ within the column.

Obviously many modifications and variations of the present invention are possible in the light of the above teachings. It is, therefore, to be understood that, within the scope of the appended claims, the invention may be practiced otherwise than as specifically described.

What is claimed is:

1. A method for stripping ammonia from a spent alkaline regenerant solution used for the regeneration of a zeolite ion exchange bed; comprising the steps of:
    a. directing the spent alkaline regenerant solution downwardly through a stripping column;
    b. passing a gas upwardly through the column countercurrent to the flow of alkaline regenerant solution;
    c. circulating an acidic working solution continuously from a holding tank through a vacuum creating means and then back into the holding tank; and
    d. withdrawing stripped ammonia from the stripping column under a vacuum created therein by said vacuum creating means so as to cause said stripped ammonia to chemically react with said acidic working solution to form an ammonium salt solution.

2. The method as defined in claim 1 wherein said acidic working solution is a weak nitric acid solution having a pH of approximately 6.

3. The method as defined in claim 1 wherein said vacuum creating means is an ejector having a vacuum side in communication with said stripping column such that the acidic working solution passing therethrough creates a vacuum in said stripping column.

4. The method as defined in claim 1 wherein gas, passed upward through said column, is substantially free of carbon dioxide.

5. The method as defined in claim 4 wherein said gas is carbon dioxide free air.

6. The method as defined in claim 1 including the step of adding acid to sadi acidic working solution to maintain the pH at approximately 6.

7. A method for stripping ammonia from a spent alkaline regenerant solution used for the regeneration of a zeolite ion exchange bed; comprising the steps of:
    a. directing the alkaline regenerant solution through a stripping column;
    b. passing a carbon dioxide free gas upwardly through the column countercurrent to the flow of regenerant;
    c. creating a vacuum in the column for withdrawing the stripped ammonia and carbon dioxide free gas therefrom;
    d. continuously recirculating the same carbon dioxide free gas through the column in a closed loop.

8. A method for stripping ammonia from a spent alkaline regenerant solution used for the regeneration of a zeolite ion exchange bed; comprising the steps of:
    a. directing the spent alkaline regenerant solution through a stripping column;
    b. passing a carbon dioxide free gas upwardly through the column countercurrent to the flow of alkaline regenerant solution;
    c. creating a vacuum in the column for withdrawing the stripped ammonia and carbon dioxide free gas therefrom;
    d. passing air containing carbon dioxide upwardly through the stripped alkaline regenerant solution leaving the column so as to cause the carbon dioxide to be removed therefrom prior to its entrance to the column and thus produce the carbon dioxide free gas of step (b).

9. A method for stripping ammonia from a spent alkaline regenerant solution used to regenerate a zeolite exchange bed for removing ammonium ions from wastewater; comprising the steps of:
    a. directing the alkaline regenerant solution through a stripping column;
    b. passing a carbon dioxide-free gas upwardly through the column countercurrent to the flow of alkaline regenerant solution;
    c. circulating an acidic working solution from a holding tank through a vacuum creating means and then back into the holding tank; and
    d. withdrawing stripped ammonia and carbon dioxide free gas from the stripping column under a vacuum created therein by said vacuum creating means so as to cause said stripped ammonia to chemically react with said acidic working solution to form an ammonium salt solution prior to its return to the holding tank.

* * * * *

UNITED STATES PATENT AND TRADEMARK OFFICE
CERTIFICATE OF CORRECTION

PATENT NO. : 3,985,859
DATED : October 12, 1976
INVENTOR(S) : Louis Blaine

It is certified that error appears in the above-identified patent and that said Letters Patent are hereby corrected as shown below:

In the abstract, line 10, insert --the-- after "with"

In column 1, line 68 delete "+" and insert -- $^{+}$ --

In column 2, line 6 delete "Optimization of" and insert --Optimization of--

In column 2, line 7 delete "Ammonia Removal by Ion Exchange Using Clinoptilo-" and insert --Ammonia Removal by Ion Exchange Using Clinoptilo- --

In column 2, line 9 delete "lite" and insert --lite--

In column 2, line 24 delete "+" and insert -- $^{+}$ --

In column 4, line 21 delete "$_{NH4}$" and insert --$NH_4$--

In column 4, line 54 delete "2' " and insert --20'--

In column 6, line 17 delete "sadi" and insert --said--

In column 6, line 51 insert --ion-- after "lite"

Signed and Sealed this

Fourteenth Day of December 1976

[SEAL]

Attest:

RUTH C. MASON
*Attesting Officer*

C. MARSHALL DANN
*Commissioner of Patents and Trademarks*